UNITED STATES PATENT OFFICE.

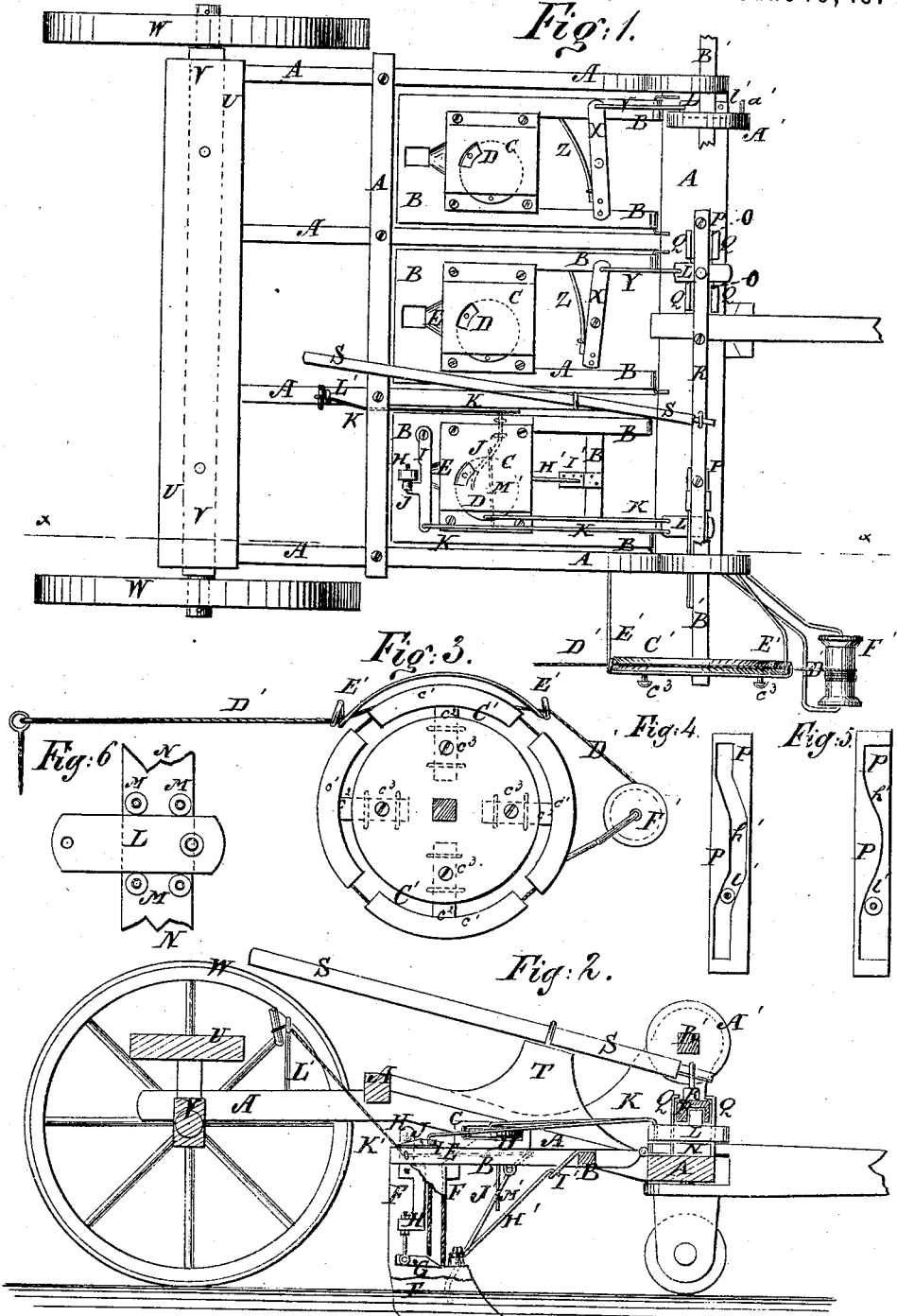

JOHN CLARRIDGE, OF MOUNT STERLING, OHIO.

IMPROVEMENT IN CORN-PLANTERS.

Specification forming part of Letters Patent No. 152,076, dated June 16, 1874; application filed April 4, 1874.

*To all whom it may concern:*

Be it known that I, JOHN CLARRIDGE, of Mount Sterling, in the county of Madison and State of Ohio, have invented a new and useful Improvement in Corn-Planter, of which the following is a specification:

Figure 1 is a top view of my improved planter, parts being broken away to show the construction. Fig. 2 is a vertical longitudinal section of the same, taken through the line $x\ x$, Fig. 1, and parts being broken away to show the construction. Fig. 3 is a detail side view of the extension rope-wheel and its attachments, parts being broken away to show the construction. Fig. 4 is an under-side view of the grooved or guide plate for operating the slide. Fig. 5 shows a modification of the same. Fig. 6 is a detail view, showing the friction-rollers.

Similar letters of reference indicate corresponding parts.

The invention will first be fully described, and then pointed out in the claims.

A is the main frame of the machine, to the front cross-bar of which are hinged the forward ends of the plow-frames B, so that the rear ends of said frames may have a vertical movement, to enable the plows to adapt themselves to any unevenness in the surface of the ground. To the upper side of the rear end of each of the frames B is secured a hollow platform, C, to the top of which the hopper is attached. From the distributer D the seed passes through a guide spout or channel, E, and drops into the cavity of the plow-standard F, where it rests upon the valve G, pivoted in the lower part of said standard F. To the rear end of the valve G is attached a rod, H, which passes up through the rear part of the frame B, and has a cross-head formed upon or attached to its upper end. I is a lever pivoted to the rear part of the frame B, and which has a wedge, J, formed upon its rear side, which, as the said lever I is forced back, passes beneath the head of the rod H, raises it, and opens the valve G, allowing the seed to drop to the ground. To the free end of the lever I, and to the projecting side of the distributer, are pivoted the rear ends of two rods, K, the forward ends of which are attached to a slide, L.

By this construction, as the slide L moves forward, the distributer is operated to drop the seed into the cavity of the standard F, and the valve G is closed to receive the seed. As the slide L moves to the rearward, the distributer is turned to receive seed for another hill, and the valve G is opened to drop the seed previously received to the ground.

The slide L moves forward and back between four friction-rollers, M, pivoted to the plate N, attached to the front cross-bar of the frame A. To the end parts of the plate N are attached two blocks, O, as thick as, or a little thicker than, the slide L, for the cross-slide P to work upon. The cross-slide P is held down upon the blocks by the clutches or keepers Q, also attached to the plate N. In the lower side of the cross-slide P is formed a curved or cam groove, $p'$, to receive a pin, $l'$, attached to the upper side of the forward end of the slide L, so that the slide L may be moved back and forth longitudinally by the transverse movement of the slide P. The pin $p'$ should have a small roller placed upon it to diminish friction. All the slides P are attached to a single cross-bar, R, so that they may all be moved together and by one operation. To the cross-bar R is pivoted the forward end of a lever, S, which is pivoted to a support, T, attached to the frame-work of the machine, and its rear end projects into such a position that it may be readily reached and operated from the driver's seat U, the supports of which are attached to the axle V, to which the rear part of the frame A is attached, and upon the journals of which the wheels W revolve. If desired, the forward ends of the two rods K may be pivoted to the end of a lever, X, which is pivoted at its middle part to the frame B, and to its other end is pivoted the rear end of the connecting-rod Y, the forward end of which is pivoted to the rear end of slide L. The lever X is provided with a spring, Z, connected with the frame B, to move the slide L in one direction. This allows one side of the groove in the transverse slide P to be removed, as shown in Fig. 5. The slide P may be omitted, and the slide L operated by the wheel A', which has one or more pins, $a'$, attached to its side, to strike against the pin $l'$ of the slide L to move it forward, the spring Z moving it back. The wheels A', one for each slide L, are attached to a shaft, B', which revolves in bearings attached to the forward part of the frame A. To one end of the shaft B' is attached the wheel C', the rim of which is made in sections $c^1$, which are attached to arms $c^2$, which fit into radial grooves in the body of the said wheel C', and are secured by set-screws $c^3$, so that the wheel may be expanded or contracted, according as the hills are to be planted wider apart or closer together. D' is a rope, which makes one turn around the wheel C', passes through guides E', attached to the frame A, and its ends are secured by stakes at the opposite sides of the field, so that the rope D' may serve as a guide to cause the machine to cross the field in a straight line, and may also operate the dropping device at regular intervals, planting the corn in accurate check-rows. In crossing the field the first time the rope is carried upon a drum, F', from which it is unwound as the machine advances, until the other side of the field has been reached, when its end is detached from the drum F' and staked to the ground. The support G' for the drum F' should be detachable, so that the drum and its support may be detached from the machine when not required for use. The draft-strain upon the plows F is sustained by a rod, H', the forward end of which is hooked into one or the other of the holes in a plate, T, attached to the frame B. J' is a rod, the upper part of which is pivoted to the frame A, and its lower part is so formed as, when moved forward, to move along the colter and push off any rubbish that may be lodged there, and might otherwise choke the plow. To the upper end of the rod J' is attached the end of a rope, K', which passes back through guide-eyes or around guide-pulleys attached to the frame A. The rear end of the rope is secured in a support, L', in such a position that it may be readily reached to operate the rod J' from the driver's seat U. The rod J', when the rope K' is released, is moved back and held out of the way by a spring, M', attached to the frame B, and which bears against the said rod J'.

Having thus described my invention, I claim as new and desire to secure by Letters Patent—

1. The combination of the plate N, friction-rollers M, blocks O, grooved cross-slide P, and longitudinal slide L, provided with a pin, $l'$, with each other, for giving motion to the two connecting-rods K, that operate the dropping device, substantially as herein shown and described.

2. The lever I, provided with a wedge, J, in combination with the connecting-rod K, and with the stem H of the valve G, substantially as herein shown and described.

JOHN CLARRIDGE.

Witnesses:
   JNO. W. HANAWALT,
   D. F. BINDER.